(12) United States Patent
Perumal et al.

(10) Patent No.: US 8,637,609 B1
(45) Date of Patent: Jan. 28, 2014

(54) BLENDS OF ACRYLIC LATICES AND POLYURETHANE DISPERSIONS FOR COATINGS

(75) Inventors: Pillai T. Perumal, Orland Park, IL (US); Padmaja Perumal, legal representative, Orland Park, IL (US); Philip J. Ruhoff, Shaker Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 13/326,815

(22) Filed: Dec. 15, 2011

Related U.S. Application Data

(60) Provisional application No. 61/424,113, filed on Dec. 17, 2010.

(51) Int. Cl.
*C08L 9/00* (2006.01)
*C08L 9/02* (2006.01)
*C08L 27/10* (2006.01)
*C08L 33/02* (2006.01)
*C08L 33/04* (2006.01)
*C08L 35/02* (2006.01)

(52) U.S. Cl.
USPC ............ 525/209; 525/221; 525/222; 525/233

(58) Field of Classification Search
USPC ................... 525/209, 221, 222, 233
See application file for complete search history.

(56) References Cited

U.S. PATENT DOCUMENTS

| | | |
|---|---|---|
| 5,011,881 A | 4/1991 | Fujii et al. |
| 5,204,404 A | 4/1993 | Werner, Jr. et al. |
| 5,230,962 A | 7/1993 | Stephenson |
| 5,286,569 A | 2/1994 | Werner, Jr. et al. |
| 5,739,194 A | 4/1998 | Natesh et al. |
| 5,854,332 A | 12/1998 | Swarup et al. |
| 5,886,082 A | 3/1999 | Numa et al. |
| 6,031,041 A | 2/2000 | Chung et al. |
| 6,194,513 B1 | 2/2001 | Sagiv |
| 6,362,273 B1 | 3/2002 | Martin et al. |
| 7,297,742 B2 | 11/2007 | Ohrbom et al. |
| 7,811,480 B2 * | 10/2010 | King .............................. 252/586 |

* cited by examiner

*Primary Examiner* — Nathan M Nutter
(74) *Attorney, Agent, or Firm* — Deron A. Cook; Robert E. McDonald; Eryn Ace Fuhrer

(57) ABSTRACT

A waterborne coating composition contains a film forming binder dispersed in an aqueous carrier; wherein the binder is an admixture including (A) about 40-60% by weight of an acrylic silane polymer derived from a monomer blend including alkyl (meth)acrylate monomers and at least one silane containing alkyl (meth)acrylate monomer; and (B) about 60-40% by weight of a polyurethane/acrylic hybrid dispersion. The composition is useful for plastic and metal substrates.

15 Claims, No Drawings

BLENDS OF ACRYLIC LATICES AND POLYURETHANE DISPERSIONS FOR COATINGS

This application claims priority to U.S. Provisional Patent Application 61/424,113 filed on Dec. 17, 2010, the entirety of which is incorporated herein by reference.

SUMMARY OF THE INVENTION

A one-component (1K), waterbased coating composition, which demonstrates excellent adhesion to both metal and plastic substrates, comprises a film forming binder dispersed in an aqueous carrier. The binder is an admixture of resins comprising, in one embodiment: (A) 40-60% by total resin weight of an acrylic silane polymer latex resin derived as a single stage, or in another embodiment, a two-stage polymerization reaction product of a monomer blend comprising: (i) one or more alkyl (meth)acrylate monomers, including at least one polymerizable hydroxyl alkyl (meth)acrylate monomer; (ii) at least one monoethylenically unsaturated carboxylic acid; (iii) at least one silane containing (meth)acrylate monomer; and optionally (iv) an alkylene urea (meth)acrylate, and/or (v) styrene; and (B) 60-40% by total resin weight of a polyurethane/acrylic hybrid resin dispersion.

The polyurethane acrylic hybrid polymer may be derived as the polymerization reaction product of a monomer blend comprising polyester polyols and polycarbonate polyols.

The composition may be pigmented for use as a color coat or, alternatively, may be used as a clear coat.

Articles coated with the coating compositions of this invention are also within the scope of this invention.

DETAILED DESCRIPTION OF THE INVENTION

A one component (1K), coating composition comprises a film forming binder comprising the admixture of: (a) at least one acrylic silane polymer and (b) at least one polyurethane/acrylic hybrid polymer, dispersed in an aqueous carrier. The combination of the acrylic silane and polyurethane/acrylic hybrid resins described herein provides a cost effective coating composition having a low volatile organic content (VOC), which is well suited for application as a clearcoat over a variety of substrates, and particularly plastic and metal substrates. Alternatively, the coating composition may be tinted with a variety of pigments to provide a color coat for plastic and metal substrates. For purposes herein, "low VOC" generally refers to less than about 150 g/kg VOC, though in some embodiments described in the present invention coatings having less than about 100 g/kg VOC may be produced.

As indicated, the film forming binder of the compositions taught herein comprises an admixture of resins, including: (a) at least one acrylic silane polymer and (b) at least one polyurethane/acrylic hybrid polymer, each of which is described in greater detail below. In some embodiments, the binder may consist essentially of resins (a) and (b) there, preferably, being not more than about 1% by weight of other types of resins. Within such embodiments, the binder may contain substantially equal weights of (a) and (b). However, in other embodiments, the binder may comprise from about 40-60% by total resin weight, or alternatively about 45-55% by total resin weight of the at least one acrylic silane polymer, with the remainder of the binder consisting essentially of the at the at least one polyurethane/acrylic hybrid polymer.

For water-borne coatings according to the present invention, the composition may comprise about 30 to 70% by weight of the film forming binder and correspondingly, about 30 to 70% by weight of an aqueous carrier, which may primarily constitute water but may, in some embodiments, contain small amounts (less than about 10% by weight) of organic solvents.

The acrylic silane polymer may usefully be derived from a monomer blend comprising: (i) one or more alkyl (meth)acrylate monomers, including at least one polymerizable hydroxyl alkyl (meth)acrylate monomer, (ii) at least one monoethylenically unsaturated carboxylic acid, and (iii) at least one silane containing (meth)acrylate monomer. In a particularly useful embodiment, the monomer blend may further comprise (iv) an alkylene urea (meth)acrylate, and in still another embodiment, the monomer blend may comprise (v) a phosphate ester, and in still further embodiments, the monomer blend may comprise (vi) styrene. For purposes of clarity, the term (meth)acrylate is intended to refer to both acrylate and methacrylate, and the term (meth)acrylic to both acrylic and methacrylic, unless provided otherwise.

The monomer blend of the acrylic silane polymer comprises one or more other alkyl (meth)acrylate monomers, most usefully, those having 1-12 carbon atoms in the alkyl group, which may be used in the monomer blend in amounts from about 15 to about 95% of total polymer weight. Useful alkyl (meth)acrylate monomers may include methyl methacrylate, ethyl (meth)acrylate, propyl (meth)acrylate, butyl (meth)acrylate, isobutyl (meth)acrylate, hexyl (meth)acrylate, 2-ethylhexyl (meth)acrylate, lauryl (meth)acrylate and the like.

Useful alkyl (meth)acrylate monomers may also include polymerizable hydroxyl alkyl (meth)acrylate monomers, particularly those having 2-4 carbon alkyl groups. Sufficient hydroxyl alkyl (meth)acrylate monomer may be used in the monomer blend prior to and during polymerization to impart to the acrylic silane polymer a hydroxyl number of between about 5 and 40. In some embodiments, the monomer blend for the acrylic silane polymerization may comprise about 5 to 25% by weight, based on the weight of the acrylic silane polymer, of one or a blend of hydroxy alkyl (meth)acrylate monomers, which may include such monomers as hydroxyethyl (meth)acrylate, hydroxylpropyl (meth)acrylate, and hydroxybutyl (meth)acrylate.

The monomer blend giving rise to the acrylic silane polymer may additionally contain polymerizable monoethylenically unsaturated carboxylic acid monomers in amounts sufficient to impart the acrylic silane polymer with an acid number of between 10 and 40 (mg KOH/g). Useful monoethylenically unsaturated carboxylic acids may include (meth)acrylic acid, itaconic acid, styrene sulfonic acid and salts thereof. These unsaturated acids may be used in an amount of about 0.1-10% by weight, based on the weight of the acrylic silane polymer.

The acrylic silane polymer may contain up to about 10% by polymer weight, based on the weight of the acrylic silane polymer, or alternatively, from about 0.1 to about 10% by weight, of at least one silane containing (meth)acrylate monomer. For purposes of the present invention, particularly useful silane containing (meth)acrylate monomers have the following structural formula:

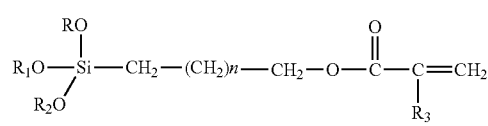

wherein:

R, R$_1$ and R$_2$ are H, CH$_3$, CH$_3$CH$_2$, CH$_3$CH$_2$CH$_2$, or CH$_3$CHCH$_3$; and R$_3$ is either H, or CH$_3$; and n is 0 or a positive integer of not greater than 8.

Employing one or more hydrolytically stable silane containing (meth)acrylate monomers, namely, those in which the alkoxy group(s) do not substantially hydrolyze, may be particularly useful in the monomer blend giving rise to the acrylic silane polymer. Exemplary hydrolytically stable silane containing (meth)acrylate monomers may include triisopropoxysilylpropyl methacrylate and triisopropoxysilylpropyl acrylate.

In some particularly useful embodiments, the monomer blend may comprise one or more alkylene urea (meth)acrylates, exemplified by N-(2-methacryloyloxyethyl)ethylene urea, methacrylamido ethylene urea.

Furthermore, in some embodiments, it may be useful to include a phosphate ester containing monomer, exemplified by phosphate esters of hydroxyalkyl (meth)acrylates, hydroxyethyl methacrylate phosphate ester, phosphate esters of polyethylene glycol methacrylate, such as Sipomer® PAM 100 (available from Rhodia, Inc.) and phosphate esters of polypropylene glycol methacrylate, such as Sipomer® PAM 200 (available from Rhodia, Inc.).

In some embodiments, up to about 50% by weight of the monomer blend may comprise styrene monomers.

The acrylic silane polymers may be formed by conventional emulsion polymerization techniques. In one such technique, a mixture of monomers as described above, water, surfactant and polymerization catalyst may be charged into a polymerization reactor and heated to about 60-95° C. for between a period of time between about 15 minutes to 8 hours. The polymerization may, in some embodiments, be a single stage polymerization, wherein the full complement of monomers is reacted in a single polymerization step. However, in other embodiments, two or more sequential polymerization stages, comprising different polymerization conditions or monomer blends may be used to design the acrylic silane polymer with a desirable morphology, such as core-shell; however other morphologies may be obtained by employing methods known in the art. The resulting polymer may be neutralized with ammonia or an amine.

The acrylic silane polymer particles may be polymerized to an average diameter about 0.1 to 0.2 microns. The resulting acrylic silane polymer will usefully have an acid number of about 5 to 40 and a hydroxyl number of about 5 to 40. The glass transition temperature may be about –40 to 25° C. The weight average molecular weight of the resultant polymer may be greater than about 25,000.

The acid groups on the polymer may be neutralized with ammonia or an amine to adjust the pH to between 7-10. Useful neutralizing amines may include primary amines and secondary amines, including: aminoethyl propanol, allylamine, 1-amino-2-propanol, 3-amino-1-propanol, benzylamine, butylamine, sec. butylamine, tert. butylamine, cyclohexylamine, decylamine, dodecylamine, ethanolamine, ethylamine, 2-ethylhexylamine, heptylamine, hexylamine, isobutylamine, isopropylamine, methylamine, octylamine, pentylamine, propylamine, ethylene diamine and the like. Particularly useful secondary amines may include 2,2-dimethyl oxaolidine-1,4,2,2-dimethanol oxazolidine-1,4,2-methyl 1-2-methanol oxazolidine-1,4,2,2-diethyl oxazolidine-1,4, dibenzyl amine, dibutylamine, dicyclohexylamine, didodecylamine, diethanolamine, diethylamine, 2,2-diethylhexylamine, dihexylamine, disopropanolamine, dimethyl amine, dioctylamine, dipentylamine, dipropylamine, 2-ethyl amino ethanol, 2(2-hydroxyethylamino)-2-(hydroxymethyl)-1,3-propanediol, 2-methyl aminoethanol, 2,(2-amino ethylamino) ethanol, 3,3 diamino-dipropylamine, diethylene triamine, N-methyl ethylene diamine and the like.

Useful catalysts may include ammonium persulfate, hydrogen peroxide, sodium meta bisulfite, hydrogen peroxide sodium sulfoxylate and the like. Useful surfactants may include nonylphenoxypolyethyleneoxy ethanol sulfate, allyl dodecyl sulfosuccinate, alkyl phenoxy polyethylene oxyethanol, sodium lauryl sulfate and mixtures thereof.

According to the present invention, a blend of monomers giving rise to a useful acrylic silane polymer may comprise, in one embodiment: methyl methacrylate, butyl acrylate, triisopropoxysilylpropyl methacrylate, styrene, methacrylic acid, and N-(2-methacryloyloxyethyl)ethylene urea.

A sequentially designed acrylic silane polymer may be derived from a two-stage polymerization wherein the stage I monomer blend and stage II monomer blend each comprises:
 (i) one or more C1 to C12 and, more usefully C1-C5 alkyl (meth)acrylates, including at least one hydroxy alkyl (meth)acrylate;
 (ii) an ethylenically unsaturated carboxylic acid;
 (iii) a silane containing (meth)acrylate;
 (iv) N-(2-methacryloyloxyethyl)ethylene urea; and
 (v) styrene.

The stage I and stage II monomer blends may have different proportions of these same monomers in order to affect the physical properties of the resultant polymer. Thus, in one embodiment, it may be useful to use higher relative amounts of higher Tg monomers in one stage over the other. For example, in one stage, the polymer yielding from the selected monomer blend may have a Tg of between about –20 and about 50° C., whereas in the other stage, the polymer yielding from the selected monomer blend may have a Tg of between about 30 and about 120° C.

In the embodiments set forth above, the one or more C1-C12 alkyl (meth)acrylates may comprise, in addition to the at least one hydroxy alkyl (meth)acrylate, a blend of methyl methacrylate and butyl acrylate.

According to some embodiments of the present invention, it is contemplated that a simple polyurethane dispersion may be admixed with the acrylic silane polymer latex to form a water dispersible binder useful in the coating compositions described herein. However, admixing the acrylic silane latex with a polyurethane/acrylic hybrid polymer dispersion has been found to be particularly beneficial.

Conventionally, polyurethanes are formed by reacting one or more of a polyester polyol, polyether polyol, polycarbonate polyol, polylactone polyol or polyacrylic polyol with a polyisocyanate in a molar ratio sufficient to ensure that the resulting intermediate product has terminal isocyanate groups, which may subsequently be reacted with a compound which has a group that is reactive with the isocyanate groups and has at least one group that is capable of forming an anion. This group may be subsequently neutralized with a tertiary amine to form a water dispersible polyurethane and the resulting polyurethane may then be chain extended in water with a diamine by reaction of the diamine with unreacted isocyanate groups of the polyurethane.

Polyurethane acrylic hybrids may be formed by extending free (meth)acrylate groups on the polyurethane chain with appropriate ethylenically unsaturated monomers, including (meth)acrylic acid and (meth)acrylate monomers. Particularly useful polyurethanes according to the present invention derive from a monomer blend comprising polyester polyols and polycarbonate polyols reacted with one or more polyisocyanates to form an isocyanate terminated product.

Conventional polyester polyols are derived from the esterification reaction product of organic polycarboxylic acids or their anhydrides with a stoichiometric excess of a diol.

The diols used in making the polyester polyols may include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids. Particularly useful polyester polyols may include poly(butanediol adipate); hexane diol adipic acid and isophthalic acid polyesters such as hexane adipate isophthalate polyester; hexane diol neopentyl glycol adipic acid polyester diols, e.g., Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF.

Useful polycarbonate polyols may include those obtained from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene.

Polyacrylic polyols may be useful in some embodiments and may be prepared by ethylenic polymerization of acrylic esters such as the aforementioned alkyl (meth)acrylates or with ethylenic unsaturated monomers containing functional groups such as carboxyl, hydroxyl, cyano groups and/or glycidyl groups. Any of the aforementioned alkyl (meth)acrylates can be used. Useful functional monomers may include (meth)acrylic acid, 2-hydroxyethyl (meth)acrylate, 2-hydroxypropyl (meth)acrylate, any of the other aforementioned hydroxyalkyl (meth)acrylates, glycidyl (meth)acrylate, 2-cyanoethyl (meth)acrylate and the like.

Suitable polyisocyanates, may include di- and tri-isocyanates, such as: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

The ratio of isocyanate to active hydrogen in the prepolymer typically ranges from about 1.3/1 to about 2.5/1, preferably from about 1.5/1 to about 2.1/1, and more preferably from about 1.7/1 to about 2/1.

Useful monomers suitable for incorporation into the isocyanate-terminated prepolymer may include hydroxy-carboxylic acids having the general formula $(HO)_xR(COOH)_y$, wherein R is a straight or branched 1-12 carbon alkyl and x and y are 1 to 3. Examples of such hydroxy-carboxylic acids include citric acid, dihydroxypropionic acid, dimethylolpropanoic acid (DMPA), dimethylol butanoic acid (DMBA), glycolic acid, lactic acid, malic acid, dihydroxymalic acid, dihydroxybenzoic acid, tartaric acid, hydroxypivalic acid, and the like, and mixtures thereof. Dihydroxy-carboxylic acids are most useful with dimethylolpropanoic acid (DMPA) being particularly useful.

The formation of the isocyanate-terminated prepolymer may be achieved without the use of a catalyst. However, a catalyst may be necessary in some instances. Examples of suitable catalysts include stannous octoate, dibutyl tin dilaurate, and tertiary amine compounds such as triethylamine and bis-(dimethylaminoethyl)ether, morpholine compounds such as $\beta,\beta'$-dimorpholinodiethyl ether, bismuth carboxylates, zinc bismuth carboxylates, iron (III) chloride, potassium octoate, potassium acetate, diazabicyclo[2.2.2]octane. The amount of catalyst used is typically from about 5 to about 200 parts per million of the total weight of prepolymer reactants.

Optional neutralization of the prepolymer having pendant carboxyl groups converts the carboxyl groups to carboxylate anions, thus having a water-dispersability enhancing effect. Suitable neutralizing agents include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Suitable tertiary amines which are used to neutralize the acid and form an anionic group for water dispersability are trimethylamine, triethylamine, dimethylaniline, diethylaniline, triphenylamine and the like.

As a chain extender, at least one of water, inorganic or organic polyamine having an average of about 2 or more primary and/or secondary amine groups, polyalcohols, ureas, or combinations thereof may suitable for use in the present invention. Useful organic amines for use as a chain extender may include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and it derivatives, and the like, and mixtures thereof. Hydrazine is preferred and is most preferably used as a solution in water. The amount of chain extender typically ranges from about 0.5 to about 0.95 equivalents based on available isocyanate.

A degree of branching of the polymer may be beneficial, but is not required to maintain an adhesion. This degree of branching may be accomplished during the prepolymer step or the extension step. For branching during the extension step, the chain extender DETA is useful, but other amines having an average of about two or more primary and/or secondary amine groups may also be used. For branching during the prepolymer step, it is useful that trimethylol propane (TMP) and other polyols having an average of about two or more hydroxyl groups be used. The branching monomers can be present in amounts up to about 4% by weight of the polymer backbone.

Acrylic features may be incorporated into the polyurethane by reacting free (meth)acryl groups, such as those derived from using hydroxy functional (meth)acrylates in the polyurethane monomer blend, with conventional alkyl (meth) acrylate groups. In the present invention, blends of butyl acrylate, methyl methacrylate and isobornyl methacrylate are useful; however, other suitable (meth)acrylate monomers may include those referenced above in relation to the acrylic polymer.

Conventional pigments that can be used in a coating composition comprising the binder disclosed herein may include metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones and the like.

The pigments can be introduced into the coating composition by first forming a mill base or pigment dispersion with either the acrylic silane polymer or the polyurethane or with another compatible polymer or dispersant by conventional techniques such as high speed mixing, sand grinding, ball milling, attritor grinding or two roll milling. The mill base is blended with other constituents used in the composition. The coating composition may contain about 0.01-2% by weight, based on the weight of the binder, of ultraviolet light stabilizers which includes ultraviolet light absorbers, screeners and quenchers. Typical ultraviolet light stabilizers include benzophenones, triazines, triazols, benzoates, hindered amines and blends thereof. Thickeners and rheology control agents can be added to the coating composition in amounts of about 0.5-5% by weight of the coating composition to provide the desired spray viscosity. Typically, acrylic polymers such as polyacrylic acid, clays, cellulosics, or urethanes can be added.

The coating composition can be applied to a plastic or metal substrate by conventional techniques such as spraying, electrostatic spraying, dipping, brushing, flowcoating and the like. The preferred method is spraying. After application, the composition may be dried at ambient temperatures but can be baked at about 50-80 C. for about 5-45 minutes to form a coating layer about 0.1-2.0 mils thick. Generally the layer is about 0.5-1.5 mils thick. For clear coat/color coat systems a clear layer usually a solvent based composition is applied to a dry film thickness of about 1.5-2.5 mils. Aqueous based clear coating compositions also can be used.

The following example illustrates the invention. All parts and percentages are on a weight basis unless otherwise indicated. Molecular weights are determined by gel permeation chromatography using polymethyl methacrylate as the standard.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

EXAMPLES

A silane acrylic polymer latex resin may be formed as follows:

A charge of 820 g of water may be fed into a conventional reaction chamber and heated to about 85° C. An emulsifier (4.35 g Rhodafac RE610 available from Rhodia), and a mixture of ammonia and water may be added to adjust the pH. Prior to commencing the monomer feed, 3.12 g ammonium persulfate may be added to the reaction chamber.

A first stage monomer blend including 28.94 g methyl methacrylate, 424 g butyl acrylate, 8 g triisopropoxysilylpropyl methacrylate (Coatosil 1757 available from Momentive), 272.5 g styrene, 13.6 g methacrylic acid, and 31.12 g N-(2-methacryloyloxyethyl)ethylene urea may be fed into the reaction chamber over a period of about 1 to 3 hours at a temperature of about 85° C. Additional emulsifier and ammonia and water may be added periodically to maintain pH in a range of between about 5 and 8.5.

Following the first monomer feed, a second monomer feed be introduced into the reaction chamber, which may comprise 185.91 g of methyl methacrylate, 102.56 g of butyl acrylate, 8 g of triisopropoxysilylpropyl methacrylate, 437.12 g styrene, 13.6 g of methacrylic acid, and 31.12 g of N-(2-methacryloyloxyethyl)ethylene urea. The second monomer feed may commence approximately 30 minutes after completion of the first monomer feed and the feed may progress for a period of 1 to 3 hours. Additional emulsifier and ammonia and water may be added periodically to maintain pH in a range of between about 5 and 8.5.

Following the second monomer feed, a redox chase comprising T-butyl hydroperoxide, isoascorbic acid, 28% aqueous ammonia and water may be selectively employed to rid the chamber of excess monomer. Next, the pH of the finished latex is adjusted to 7-8.5.

A polyurethane acrylic hybrid polymer dispersion may be formed as follows:

A blend of 352.8 g polyester polyol (Piothane 67-1000), 98 g of a polycarbonate polyol (perstorp Oxymer m-112), 51.4 g dimethylolpropionic acid and 8.2 g trimethylolpropane are charged to a suitable reaction chamber under heat to about 55° C. Subsequently 61.4 g N-methylpyrrolidone, 462.4 g tetramethylxylene diisocyanate (TMXDI), 0.02 g dibutyltin dilaurate (DBTDL) catalyst, 18.2 g hydroxyethyl methacrylate and 0.2 g hydroquinone monomethylether (MEHQ) may be fed into the reaction chamber and heated to about 85° C. until the NCO of about 5.7 to 6 is reached, at which time the material is cooled to about 70° C. and 38.3 g triethylamine is added to neutralize the polymer. The prepolymer may be dispersed into approximately 1853 g of water. Chain extension may commence with addition of 47.8 g ethylene diamine.

To approximately 1730 g of the prepolymer held at room temperature may be added a redox chase comprising a blend of water, isoascorbic acid, and t-butyl hydroperoxide. Additional surfactant (eg. Triton X-305 available from Dow Chemical Co.) and an iron complex (eg. Iron/ethlenediaminetetraacetic acid complex—Akzo Nobel) may also be added.

Under heat (50° C.) a blend of monomers comprising 104 g methyl methacrylate, 110 g butyl acrylate and 55 g isobornyl methacrylate and 25.8 g trifluoro ethylmethacrylate may be fed over a period of about 1 to 3 hours.

A coating composition may comprise substantially equal weight percents of the acrylic silane polymer latex and polyurethane acrylic hybrid dispersion described in the example above.

Having thus described the invention, it is now claimed:

1. A waterbased coating composition comprising an aqueous dispersion of a film forming binder resin comprising an admixture of:
   (A) an acrylic silane resin derived as the polymerization reaction product of a monomer blend comprising:
      (i) at least one polymerizable hydroxyl alkyl (meth)acrylate monomer,
      (ii) at least one monoethylenically unsaturated carboxylic acid,
      (iii) at least one silane containing (meth)acrylate monomer; and
      (iv) optionally, an alkylene urea (meth)acrylate; and
   (B) a polyurethane/acrylic hybrid resin.

2. The coating composition of claim 1, wherein the film forming binder resin consists essentially of the admixture of acrylic silane resin (A) and polyurethane/acrylic hybrid resin (B).

3. The coating composition of claim 1, wherein the monomer blend of the acrylic silane resin further comprises:
   (v) styrene.

4. The coating composition of claim 3, wherein the monomer blend of the acrylic silane resin further comprises:
   (vi) a phosphate ester.

5. The coating composition of claim 1, wherein the monomer blend of the acrylic silane resin comprises 0.1% to 10%, with respect to total acrylic silane polymer weight of at least one silane containing (meth)acrylate monomer.

6. The coating composition of claim 5, wherein the acrylic silane resin has an acid number of between 10 and 40 mg KOH/g.

7. The coating composition of claim 5, wherein the monomer blend of the acrylic silane resin comprises 5% to 25%, with respect to total acrylic silane polymer weight of hydroxyl alkyl (meth)acrylate monomer.

8. The coating composition of claim 1, wherein the at least one silane containing (meth)acrylate monomer is selected from the group consisting of triisopropoxysilylpropyl methacrylate, triisopropoxysilylpropyl acrylate and blends thereof.

9. The coating composition of claim 8, wherein the alkylene urea (meth)acrylate is selected from the group consisting of N-(2-methacryloyloxyethyl)ethylene urea, methacrylamido ethylene urea and blends thereof.

10. The coating composition of claim 1, wherein the acrylic silane resin has a weight average molecular weight of greater than about 25,000.

11. A waterbased coating composition comprising an aqueous dispersion of an acrylic silane resin derived as the polymerization reaction product of a monomer blend comprising:
   (i) at least one silane containing alkyl (meth)acrylate, selected from the group consisting of triisopropoxysilylpropyl methacrylate, triisopropoxysilylpropyl acrylate and blends thereof
   (ii) styrene;
   (iii) at least one ethylenically unsaturated carboxylic acid;
   (iv) an alkylene urea (meth)acrylate, selected from the group consisting of N-(2-methacryloyloxyethyl)ethylene urea and methacrylamido ethylene urea; and
   (v) at least one C2-C4 hydroxy alkyl (meth)acrylate monomer.

12. The waterbased coating composition of claim 11, wherein the monomer blend of the acrylic silane resin further comprises:
   (vi) at least one C1-C12 alkyl (meth)acrylate monomer.

13. A waterbased coating composition of claim 12, further comprising at least one other resin selected from polyurethane and polyurethane/acrylic hybrid resins.

14. A waterbased coating composition comprising an aqueous dispersion of a resin blend comprising:
   (A) about 40% to 60% of total resin weight of an acrylic silane resin derived as the polymerization reaction product of a monomer blend comprising:
      (i) about 0.1 to 10% by weight with respect to the acrylic silane resin monomer blend, of at least one silane containing alkyl (meth)acrylate, selected from the group consisting of tri-isopropoxysilylpropyl (meth)acrylate;
      (ii) up to about 50% by weight with respect to the acrylic silane resin monomer blend, of styrene;
      (iii) about 0.1 to 10% by weight with respect to the acrylic silane resin monomer blend, of at least one ethylenically unsaturated carboxylic acid;
      (v) about 15 to 95% by weight with respect to the acrylic silane resin monomer blend, of at least one C1-C12 alkyl (meth)acrylate monomer; and
      (vi) about 5 to 25% by weight with respect to the acrylic silane resin monomer blend, of at least one C2-C4 hydroxy alkyl (meth)acrylate monomer; and
   (B) about 40% to 60% of total resin weight of at least one other resin selected from polyurethane and polyurethane/acrylic hybrid resins.

15. The waterbased coating composition of 14, further comprising a pigment.

* * * * *